Sept. 18, 1962     E. K. HOWELL     3,054,991
LOAD MONITORING CIRCUIT
Filed July 2, 1959                                    2 Sheets-Sheet 1
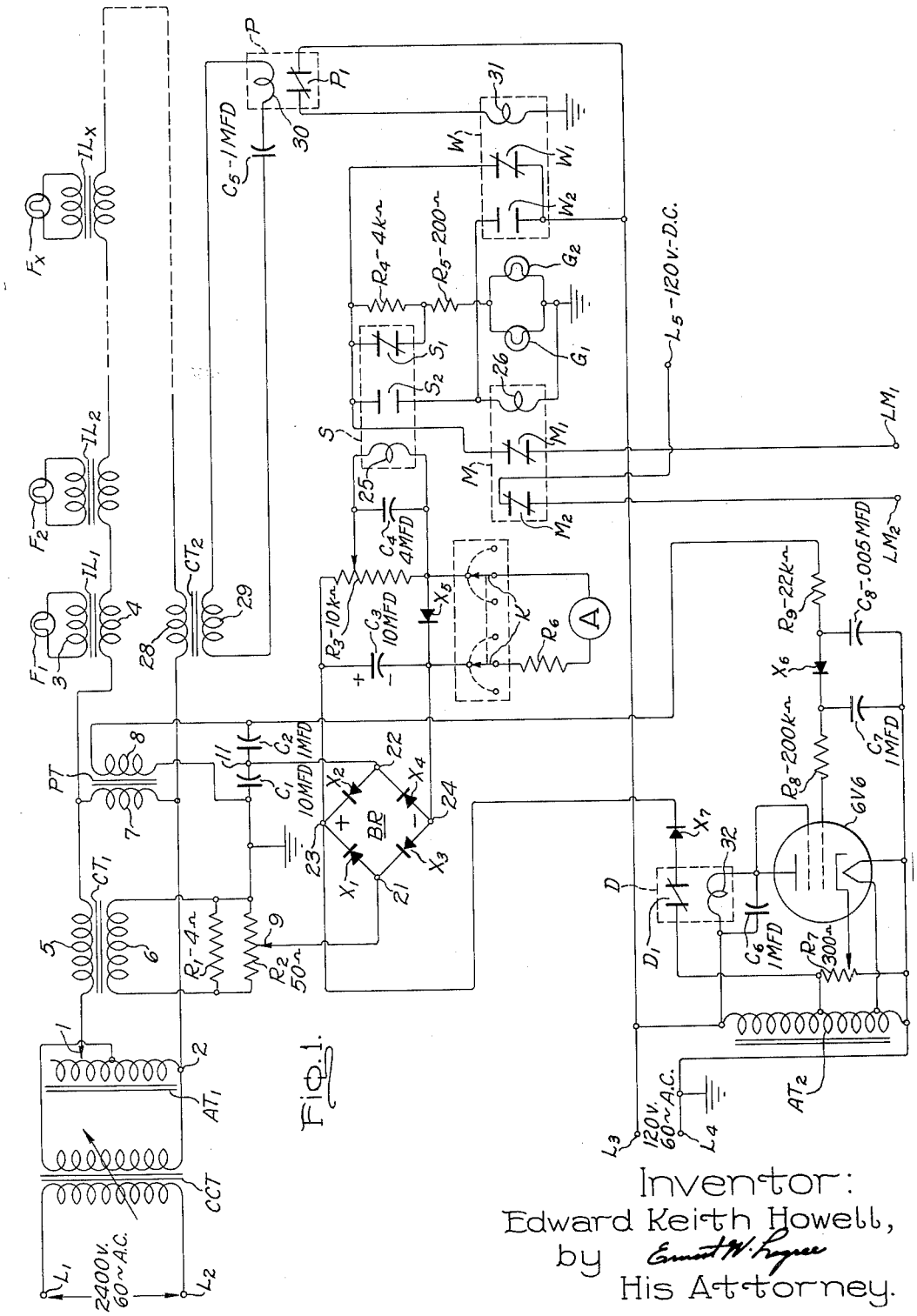
Inventor:
Edward Keith Howell,
by    *Ernest W. Lupee*
His Attorney.

Sept. 18, 1962  E. K. HOWELL  3,054,991
LOAD MONITORING CIRCUIT
Filed July 2, 1959  2 Sheets-Sheet 2

Inventor:
Edward Keith Howell,
by Emmett W. Rogers
His Attorney.

United States Patent Office 3,054,991
Patented Sept. 18, 1962

3,054,991
LOAD MONITORING CIRCUIT
Edward Keith Howell, Hendersonville, N.C., assignor to
General Electric Company, a corporation of New York
Filed July 2, 1959, Ser. No. 824,493
4 Claims. (Cl. 340—251)

This invention relates generally to a monitoring or control circuit for series connected load devices. It is more specifically concerned with a circuit arrangement for detecting lamp failures in a series lighting load.

In certain lighting systems where a number of lamps are operated in series from a constant current supply, it is desirable to have a load monitoring circuit for detecting and indicating the failure of a preset number of lamps. This is particularly important in applications where the lamps function as signals in addition to providing illumination, as for instance in airport runway or approach lighting.

The principal object of the invention is to provide a new and improved load monitoring circuit of the foregoing kind.

Another object of the invention is to provide a load monitoring or control circuit of the foregoing kind which will in addition respond to a complete short circuit or open circuit of the series lighting load.

In a preferred load monitoring circuit embodying the invention in conjunction with an incandescent lamp series lighting load, each lamp is provided with its individual isolating transformer. The primary windings of the isolating transformers are connected in a series circuit driven by a constant current transformer. A current transformer and a potential transformer provide signals proportional to the current through and to the voltage across the series load. Comparison of these signals is effected by applying them in opposition to the input terminals of a bridge rectifier and the D.C. output signal of the bridge rectifier serves, after suitable translation, to actuate the load monitor indicators.

An important feature of the invention resides in using the short voltage pulses occurring in the voltage signal as a result of an open-circuited isolating transformer, to govern in large part the difference signal output of the bridge rectifier. These pulses result from the voltage induced during the initial portion of each half-cycle prior to saturation of the core of the open-circuited isolating transformer. The magnitude of the pulses varies with the number of open-circuited isolating transformers and the difference output signal of the bridge rectifier is nearly equal to the peak pulse voltage. Thus a definite relationship exists between the difference signal output of the bridge rectifier and the number of open-circuited lamps which permits presetting the monitor for operation after a given number of lamp failures.

In the preferred embodiment of the system in accordance with the invention, open circuit and short circuit protection of the series lighting load are also provided. These protective features also serve to operate the same load monitor indicators as serve to indicate the presence of lamp failures in excess of a preset number.

For further objects and advantages and for a better understanding of the invention, attention is now directed to the following description of a preferred embodiment taken in conjunction with the accompanying drawings. The features of the invention believed to be novel will be more particularly pointed out in the appended claims.

In the drawings:

FIG. 1 is a schematic diagram of an incandescent lamp system embodying the invention.

Figure 2A:
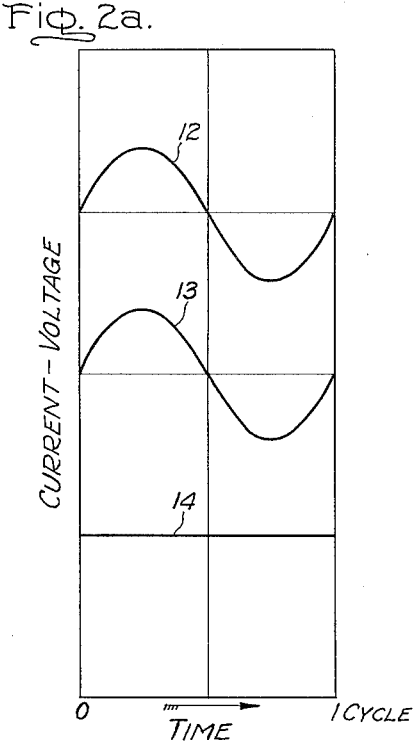
FIGS. 2a and 2b illustrate various waveforms pertinent to the system.

Referring to the drawings and more particularly to FIG. 1, the illustrated system intended particularly for airport approach lighting is energized from a 2400-volt, 60-cycle A.C. supply at terminals $L_1$, $L_2$ of a constant current transformer CCT. The output of the constant current transformer is supplied to an autotransformer $AT_1$ which has an adjustable output tap or terminal 1 to permit changing the output current to obtain various degrees of light intensity from the lamps in the series load. In a typical installation, the system can operate 90 to 140 incandescent lamps of 300 watts rating. The values of circuit elements given in the drawing by way of examples are suitable for a system of this rating and capacity.

The incandescent lamps $F_1$ to $F_X$ are energized in conventional fashion by means of iron-cored isolating transformers $IL_1$ to $IL_X$. In each case the lamp is connected across the secondary winding 3 of the isolating transformer; the primary windings 4 are all connected in series across terminals 1, 2 of the autotransformer $AT_1$. The isolating transformers supply to the lamps their rated current when the design current is flowing through the series circuit, and at the same time provide a safety measure preventing the high voltage of the series circuit from reaching the lamp sockets.

A current transformer $CT_1$ has its current or primary winding 5 connected in series with the lighting load; its secondary or output winding 6 provides across load resistors $R_1$ and $R_2$ a voltage signal which is a function of load current. A potential transformer PT has its primary winding 7 connected across the series lighting load and its secondary winding 8 connected across a capacitive voltage divider comprising capacitors $C_1$ and $C_2$. The potential transformer provides across capacitor $C_1$ a signal which is a function of load voltage and which is attenuated 11:1 by the capacitive voltage divider in order to reduce the magnitude of the voltage signal approximately to that of the current signal. The phasing of transformers $CT_1$ and PT is such that the secondary or output voltages of both transformers are substantially in phase. Potentiometer $R_2$ and the capacitive voltage divider form the first part of a comparison circuit. Potentiometer $R_2$ can be adjusted such that the voltage from ground to its tap 9 is substantially equal to the voltage from ground to the junction 11 of capacitors $C_1$, $C_2$. When that is the case, the voltage across terminal points 9 and 11 is very nearly zero. This condition can be achieved only when the load circuit is operating properly and is primarily resistive. Although the leakage reactances of the isolating transformers IL will not permit a perfect null, it is sufficiently complete for the present purpose. The null condition is illustrated by the waveforms of FIG. 2a. Curve 12 illustrates the potential transformer signal, curve 13 illustrates the current transformer signal, and substantially straight line 14 illustrates the difference signal (of zero amplitude) developed across terminal points 9, 11.

Figure 2B:
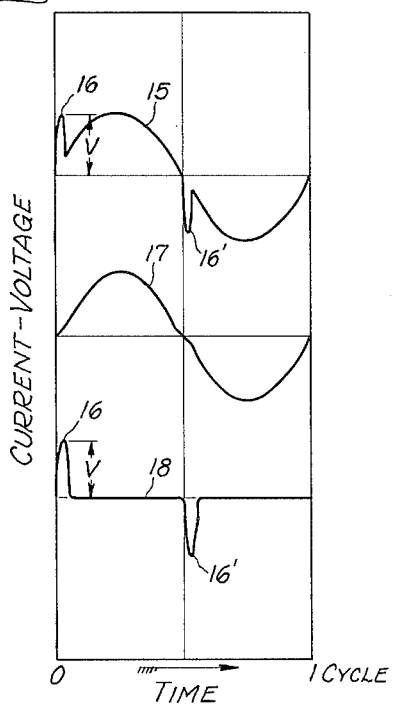

When a lamp F burns out, the corresponding isolating transformer IL has an open-circuited secondary circuit so that its primary circuit appears simply as an iron-core inductance. During the relatively short initial portion of each half-cycle when the current is low, the incremental inductance of the IL transformer is high and the rate of change of current therethrough produces a large voltage drop thereacross; the core soon saturates thereby reducing the incremental inductance and the voltage drop nearly to zero. Referring to FIG. 2b, curve 15 illustrates the voltage waveform produced by potential transformer PT under the condition of an open-circuited isolating transformer IL causing the production of the short voltage pulses 16 at the beginning of each half-cycle. The magnitude V of the pulse is a direct but non-linear function of the number of open-circuited IL transformers. Since all IL transformers have the same current flowing through their primary windings, the voltage pulses generated by any open-circuited ones occur at the same time and are additive. However as more IL transformers become open-circuited, the increment in pulse voltage becomes less and less. This may be explained considering that the basic equivalent circuit of the constant current transformer CCT is a high voltage source in series with a controlled reactance having a control time constant longer than one-half cycle ($\frac{1}{120}$ second). Thus the supply voltage is limited and the maximum pulse voltage is therefore also limited, so that the increment in pulse amplitude becomes less for each additional open-circuited IL transformer.

The occurrence of an open-circuited isolating transformer causes little change in the current signal waveform represented by curve 17 in FIG. 2b. The difference voltage of the potential transformer PT and current transformer $CT_1$ appearing between tap 9 of potentiometer $R_2$ and junction 11 of the capacitive voltage divider is represented by curve 18. Since a null condition previously existed, the difference voltage consists substantially of the positive and negative going pulses 16 and 16'. The difference or pulse voltage is applied to input terminals 21, 22 of bridge rectifier BR. The bridge rectifier consists of four silicon diodes $X_1$ to $X_4$ arranged for positive conduction to diagonal output terminal 23 and negative conduction to opposite terminal 24. The bridge rectifier produces across load capacitor $C_3$ a unidirectional voltage with the polarity indicated and which is nearly equal to the peak amplitude V of the pulse voltage. Potentiometer $R_3$ connected across load capacitor $C_3$ in series with diode rectifier $X_5$ (for a purpose to be explained shortly), provides variable attenuation of this D.C. output voltage and supplies same to the operating coil 25 of sensitive relay S. Capacitor $C_4$ connected in parallel with coil 25 provides additional smoothing of the relay current to prevent chattering. By suitable adjustment of potentiometer $R_3$, the sensitive relay S may be set to pick up or operate at any point over a range of 4 to 10 open-circuited isolating transformers IL. This range can be extended in both directions by proper choice of the magnitudes of component elements; however extension in the direction of more open-circuited IL transformers reduces the accuracy of the setting because of the nonlinearity of the magnitude of the pulse voltage relative to the number of open-circuited isolating transformers, as previously described.

When sensitive relay S operates or picks up, its normally closed contacts $S_1$ open so that resistor $R_4$ is no longer shunted and now appears in series with indicator lamps $G_1$ and $G_2$ across the 120 volt A.C. supply which is connected to line terminals $L_3$ and $L_4$. This reduces the brightness of the indicator lamps to an imperceptible level in order to provide a local indication. At the same time normally open contacts $S_2$ of the sensitive relay close and thereby energize operating coil 26 of master relay M. Thereupon normally closed contacts $M_1$ open and de-energize line monitor terminal $LM_1$ leading to a remote load monitor indicator and normally energized with 120 volt A.C. Also normally closed contacts $M_2$ open and de-energize line monitor terminal $LM_2$ leading to another remote load indicator normally supplied with 120 volt D.C. from terminal $L_5$. To reduce sticking of the contacts of sensitive relay S, resistor $R_4$ is provided in series with indicator lamps $G_1$ and $G_2$ to keep the lamps warm at all times. Another resistor $R_5$ of lesser ohmic value limits the inrush current into the lamps as well as the steady-state current in order to prolong lamp life.

Figure 3:
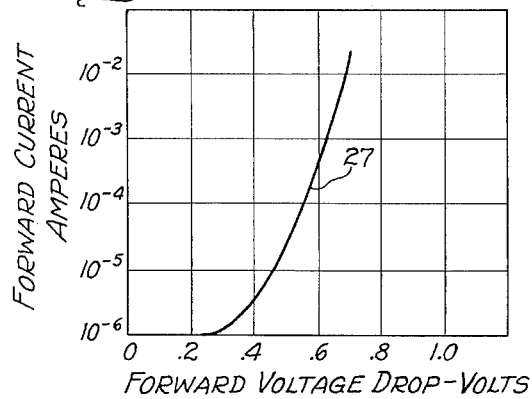
FIG. 3 illustrates the volt-ampere characteristics of a rectifier used as a meter shunt in the system.

Since the ratio of the load voltage signal to the load current signal depends upon the total number of lamps connected into the series load, the balancing adjustment of potentiometer $R_2$ assuring null voltage across the bridge rectifier when all lamps are operating, must be done after the equipment is installed and operating. For this purpose, a meter A is incorporated in the D.C. output circuit of bridge rectifier BR to indicate when a null is reached. The meter must be sensitive enough to show an accurate balance, yet must also tolerate the comparatively large unbalance which occurs when several isolating transformers IL are open-circuited. This has been achieved by providing a nonlinear meter shunt comprising silicon diode $X_5$ across the meter which is connected in series with potentiometer $R_3$ across load capacitor $C_3$. Current flow through diode $X_5$ is always in the forward direction and the voltage drop across the diode is an extremely nonlinear function of current. As illustrated by curve 27 in FIG. 3, after current flow has begun, the increment in voltage drop falls off rapidly with increasing current flow. In a preferred embodiment, a 0–100 microammeter is used with a suitable series resistor $R_6$ to make the total meter-circuit resistance 7000 ohms. To produce full deflection of the meter (current flow of 100 microamperes) requires 0.7 volt across the diode which corresponds to .01 ampere total current in the diode and in the meter. However at half-scale (50 microamperes), 0.35 volt is required corresponding to a diode current of 2 microamperes and a total circuit current of 52 microamperes. Thus the microammeter reads substantially true current below half-scale and is adequately sensitive for the balancing adjustment. However it becomes quite compressed in the upper half of the scale so that the maximum expected current of .01 ampere will not damage the instrument. A three position switch K permits the same meter to be used for balancing three different monitoring systems.

It is desirable that the system respond to and indicate a complete open circuit of the series lighting load. For this purpose, an open circuit protector is provided comprising a current transformer $CT_2$ whose primary or current winding 28 is connected in series with the lighting load. The secondary or output winding 29 of transformer $CT_2$ is connected, in series with a capacitor $C_5$, across operating coil 30 of protective relay P. Under normal conditions when current is flowing in the series lighting load, relay P is energized and its normally closed contacts $P_1$ are open. In this condition there is no current flow to the coil 31 of relay W. However, when the series lighting load becomes open-circuited, relay P is de-energized, its contacts $P_1$ close, and winding 31 of relay W is energized. This causes normally closed contacts $W_1$ to open thereby switching off local indicator lights $G_1$ and $G_2$, and normally open contacts $W_2$ to close thereby energizing coil 26 of relay M. Energization of relay M in turn switches off the remote load monitor indicators.

Short circuit detection and indication is accomplished by rectifying the voltage signal from secondary 8 of potential transformer PT through diode $X_6$ to produce a positive D.C. grid voltage at the control grid of an electric discharge device such as pentode tube 6V6 under normal operating conditions. Resistor $R_9$ and capacitor $C_8$ form a low-pass filter to protect diode $X_6$ from transient voltage surges. Capacitor $C_7$ is a D.C. filter capacitor while resistor $R_8$ limits the grid current. The positive voltage normally applied at the control grid of tube 6V6 causes plate current to flow through operating coil 32 of relay D from the 120 volt A.C. supply applied to line terminals $L_3$, $L_4$.

If a short circuit should occur in the series load circuit, the voltage signal from potential transformer PT collapses so that a positive signal is no longer supplied to the control electrode of the tube. The bias on the cathode of the tube is determined by potentiometer $R_7$ connected across a portion of autotransformer $AT_2$ and is set to cut off plate current under these conditions and cause relay D to drop out. Normally closed contacts $D_1$, which have been held open by the plate current flow through coil 32 of the relay, now close and an A.C. potential (of approximately 15 volts for the illustrated circuit) from autotransformer $AT_2$ is supplied to diode $X_7$. Diode $X_7$ in turn rectifies the A.C. voltage and injects a D.C. voltage into load capacitor $C_3$ of the bridge rectifier. This causes sensitive relay S to operate and brings about indication of the short circuit in the usual way by dimming of the local indicator lamps and operation of the remote load monitor indicators. Capacitor $C_6$ serves to smooth the half-wave current through coil 32 of relay D in order to prevent chattering of the relay contacts.

The invention thus provides a simple and effective load monitoring system which will reliably indicate the fact of burnt out lamps (or other desired load device) in excess of a preset number within the lighting system. A local indication is provided by means of indicator lamps and in addition remote indication can be provided by any suitable device. The specific embodiment described can be preset for operation at any number of burnt out lamps from four to ten. The indicators or monitoring devices will also be actuated both locally and remotely in the event of an open circuit or in the event of a short circuit.

The specific embodiment of the invention which has been described is intended as exemplary and not by way of limitation. Various modifications will readily occur to those skilled in the art, for instance in the sizes and ratings of the lamps or load devices which may, if desired, be suitable discharge lamps instead of incandescent lamps, and in the details of the relays and indicators or monitors. The scope of the invention is therefore to be determined by the appended claims.

What I claim as new and desire to secure by Letters Patent of the United States:

1. A monitoring system comprising in combination with a constant current transformer, a plurality of lamps, individual iron-cored isolating transformers, one for each lamp, said isolating transformers having primary windings connected in a series load circuit across said constant current transformer and secondary windings connected to said lamps, a current transformer for obtaining a waveform corresponding to the current through said series load circuit, a potential transformer for obtaining a waveform corresponding to the voltage across said series load circuit, a comparison circuit including means for achieving a null balance of said waveforms under normal operating conditions and for providing a difference signal proportional to the difference of said waveforms residing in short voltage pulses occasioned in said voltage waveform by an open-circuited isolating transformer, and a rectifier circuit providing a rectified difference signal proportional to the amplitude of said pulses, a relay circuit responsive to said rectified difference signal for operating indicators when said rectified difference signal exceeds a given signal strength, and indicators operated by said relay circuit.

2. A monitoring system in combination with a constant current source suplying a plurality of load devices through individual isolating transformers having primary windings connected in a series load circuit across said source and secondary windings connected to said load devices, comprising a current transformer for obtaining one potential proportional to the current through said series load circuit, a potential transformer for obtaining another potential proportional to the voltage across said series load circuit, a comparison circuit providing a difference signal proportional to the difference of said potentials and including a load capacitor charged by said difference signal, a short circuit detection circuit including means for producing a biasing potential serving to bias on an electric discharge device except when said series load circuit is short circuited, means controlled by said electron discharge device for injecting a charge into said load capacitor in the event of elimination of said bias potential by reason of a short circuit in said series load circuit, and a relay circuit responsive to the charge on said load capacitor for operating indicators when said difference signal exceeds a given signal strength.

3. A monitoring system comprising in combination with a constant current transformer suplying, a plurality of lamps, individual iron-cored isolating transformers, one for each lamp, said isolating transformers having primary windings connected in a series load circuit across said source and secondary windings connected to said lamps, a current transformer for obtaining a waveform corresponding to the current through said series load circuit, a potential transformer for obtaining a waveform corresponding to the voltage across said series load circuit and which shows a short voltage pulse at the initiation of each half cycle prior to saturation in the core of an isolating transformer in the event of an open-circuited lamp thereacross, a comparison circuit including a four-diode bridge receiving said waveforms in opposition and providing a unidirectional difference signal of an amplitude substantially equal to said pulses, a load capacitor charged by said difference signal, means for attenuating one of said waveforms to achieve substantialy zero difference signal under normal operating conditions of said series load circuit, a sensitive relay connected across said load capacitor through a sensitivity adjusting means for assuring operation of said relay at a preset signal strength corresponding to a given number of open-circuited lamps in said series load circuit, and indicating means operated by said sensitive relay.

4. A monitoring system in combination with a constant current transformer source supplying a plurality of lamps through individual isolating transformers each comprising an iron core with a primary winding and a secondary winding, the primary windings being connected in a series load circuit across said source and the secondary windings being connected to said lamps, comprising a current transformer for obtaining a waveform corresponding to the current through said series load circuit, a potential transformer for obtaining a waveform corresponding to the voltage across said series load circuit and which shows a short voltage pulse at the initiation of each half cycle prior to saturation in the core of an isolating transformer in the event of an open-circuited lamp thereacross, a comparison circuit including means for achieving a null balance of said waveforms under normal operating conditions and a four-diode bridge receiving said waveforms in opposition and providing a unidirectional difference signal of an amplitude substantially equal to said pulses, a load capacitor charged by said difference signal, a short circuit detection circuit including means for producing a biasing potential serving to bias on an electric discharge device except when said series load circuit is short circuited, means controlled by said electron discharge device for injecting a charge into said load capacitor in the event of elimination of said bias potential by reason of a short circuit in said series load circuit, a first relay circuit responsive to the charge on said load capacitor, an auxiliary relay circuit responsive to an open circuit in said series load circuit, and indicators operated by said relay circuits.

References Cited in the file of this patent

UNITED STATES PATENTS

| | | |
|---|---|---|
| 1,466,110 | Beckwith et al. | Aug. 28, 1923 |
| 1,973,520 | Belt | Sept. 11, 1934 |
| 2,424,131 | Warnick | July 15, 1947 |
| 2,449,739 | Duttera | Sept. 21, 1948 |
| 2,576,132 | Marbury | Nov. 27, 1951 |
| 2,953,722 | Willis | Sept. 20, 1960 |

FOREIGN PATENTS

| | | |
|---|---|---|
| 559,654 | Great Britain | Feb. 29, 1944 |